June 26, 1962 M. F. H. GOUVERNEUR II 3,040,796
FREE RUN ON SEALING LOCK NUT
Filed Sept. 10, 1959

INVENTOR.
Minor F.H.Gouverneur II.
BY
Robert D. Silver
H Hornby

United States Patent Office 3,040,796
Patented June 26, 1962

3,040,796
FREE RUN ON SEALING LOCK NUT
Minor F. H. Gouverneur II, Wheaton, Ill., assignor to Illinois Tool Works, Inc., a corporation of Delaware
Filed Sept. 10, 1959, Ser. No. 839,253
1 Claim. (Cl. 151—7)

This invention relates to locking nuts and particularly to nut arrangements having deformable inserts. An object of this invention is to provide a new and improved locking nut having a deformable insert secured therein which nut is free running in initial assembly since the deformable insert does not contact the threads of the stud during such period but upon the final tightening down to the final position, the deformable insert forms a complete vapor and fluid seal between the nut, the workpiece of application, and the stud to which the nut is attached.

A further object of this invention is to provide a nut of aforementioned characteristics which, after being positioned in final assembled relation to the stud and workpiece of application, will provide a locking action of the so-called prevailing torque type which prevents voluntary regressive rotation of the nut.

Another object of this invention is to provide a two-piece assembly of a nut and a plastic insert which are preassembled by a force fit or interference fit relation prior to application to the workpiece and the stud, but after application to the workpiece and the stud become a more or less integral unit due to cold flow characteristics of the plastic insert such that the plastic insert will back off and remain integral with the nut upon removal from the stud.

A further object of this invention is to provide a preassembled unit of aforementioned characteristics which is re-usable and does not have to be disposed of after once being assembled to a workpiece and stud.

A further object of this invention is to provide a locking nut having the aforedescribed characteristics which is usable in applications of wide tolerance.

A further object of this invention is to provide a locking nut which is very easy to preassemble there being no clamping means or swaging, etc. necessary to retain the insert and nut in preassembled relation.

The novel features that are characteristic of the invention are set forth with particularity in the appended claim. The invention itself, however, both as to its organization and its method of operation, together with additional objects and advantages thereof will best be understood by the following description of specific embodiments when read in connection with the accompanying drawings in which:

Figure 1:
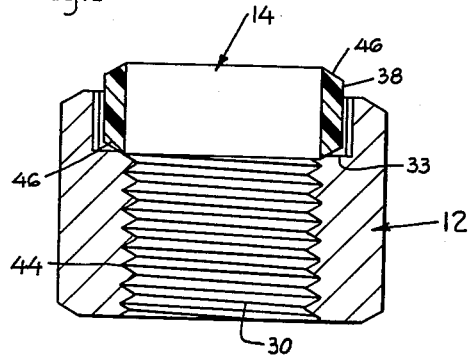
FIG. 1 is a vertical sectional view of the nut and insert in preassembled relation.
Figure 2:
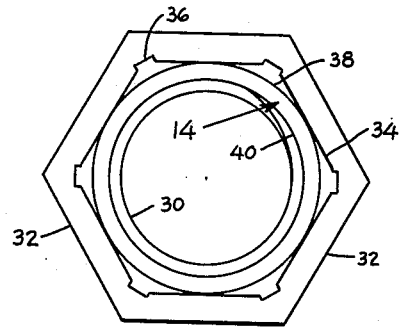
FIG. 2 is a top view of the preassembly shown in FIG. 1.
Figure 3:
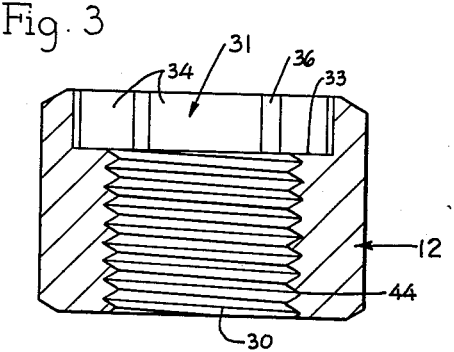
FIG. 3 is a vertical sectional view similar to FIG. 1 showing the nut without the insert.

Returning to FIG. 5 of the drawings, a completed assembly 10 shows a nut means 12 having insert 14 sealingly fastened to a stud means 16 which is here shown in threaded form. The stud means 16 is formed with a head means 26 and extends through workpieces 18 and 20 having apertures 22 and 24 formed therein. A suitable lock washer 28 is shown interposed between the head means 26 and the workpiece 20 to prevent rotation thereof.

The nut means 12 is here shown formed of a generally hexagonal shaped outer configuration having driver engageable sides or flats 32. The nut means may be formed with a threaded bore 30 and a hexagonal shaped recess counterbore 31 being of predetermined size larger than the size of the bore 30. A short cylindrical insert means 14 preferably is formed of a semi-hard plastic material such as linear polyethylene, nylon, and other materials of similar functional characteristics for insertion within the counterbore 31. For ease of assembly the insert means 14 is preferably beveled as shown at 46. The outer side walls 38 of the insert means 14 preferably have a diameter sufficiently large to provide a force or friction fit with the side walls 34 of the recess counterbore. The inner side walls 40 of the insert means 14 preferably have a diameter slightly larger than the root diameter 44 of the threads of the bore 30 to clear the male thread.

It is preferred that the counterbore 31 be of such depth relative to the axial length of the insert means 14 such that at least 20% of the insert means extends beyond the end surface of the nut as is clearly shown in FIG. 1 of the drawings when the insert is preassembled and bottomed on the shoulder means 33.

Depending upon the hardness of the plastic material employed as the insert, it is preferable that the corners of the hex-shaped counterbore be relieved as shown at 36.

The number and depth of splines or recesses 36 required to key the plastic insert to the outer shell of the nut body is determined by the tensile strength of the material used for the insert. Strong materials such as Teflon or nylon will require fewer and shallower splines or recesses, whereas weaker or softer materials such as polyolefins, acetates, vinyls, etc. will require more recesses or splines plus a hexagonal cavity such as is shown in 34.

Figure 7:
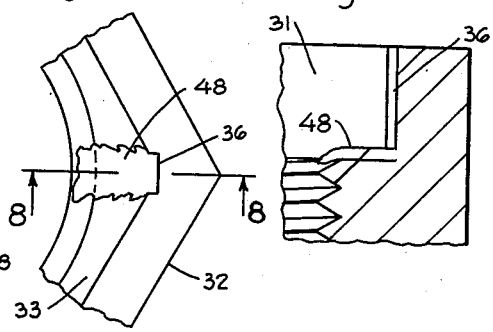
FIG. 7 is an enlarged fragmentary top view of an alternate construction of the recesses shown in FIG. 2.
Figure 8:
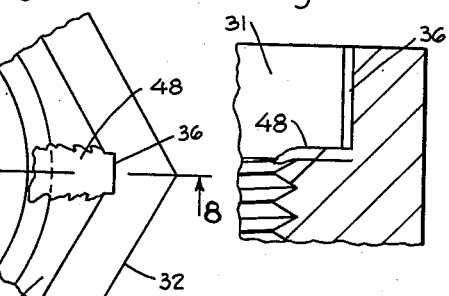
FIG. 8 is a sectional view along lines 8—8 of FIG. 7.

One convenient manner of forming the splines or recesses 36 is to use a broaching tool in the forming operation of the hex such that the excess of the metal forced away from the corners is left as a hump or protuberance 48 at the base of the recess 36, and extending out into the counterbore shoulder area 33. (See FIGS. 7 and 8.) One advantage of having the rough, jagged protuberance material 48 is that it prevents rotational relative movement of the insert 14 after preassembly and during the first stages of assembly to the stud means 16. For use with softer plastics, the areas 48 provide more keying or interference surfaces.

As aforementioned, the internal diameter of the insert means 14 is slightly greater than the root diameter 44 of the threaded bore 30 and thus, in beginning assembly to the stud 16, the plastic insert does not engage the crest diameter of the stud means 16. As the nut means 12 with the insert 14 associated therewith engages with the workpiece of application, the leading edge of the insert means 14 engages the workpiece 18 surrounding hole 22 causing the plastic insert 14 to compress axially and expand radially.

Depending to some extent upon the size of the clearance hole, the plastic material is forced by the compression forces thereon further into the upset or recessed portions 36 of the counterbore of the nut means 12, into intimate engagement with the threads of the stud 16, and into the open area between the clearance hole 22 and the stud means 16. If the clearance holes 22 and 24 are quite close in tolerance to the size of the stud 16, an excess of material 50 (shown in FIG. 5) may be sheared off by the upper edge surface of the counterbore 31.

It can be readily seen that this construction affords a wide range of tolerance in the clearance holes in the workpieces of application and yet will afford a good tight seal therewith over this wide range of application. The limiting factors in providing an ample volume of excess material of insert beyond the end surface of the nut, is determined by taking the maximum tolerance of the clearance hole 22 and the minimum tolerance on the stud. One other limiting factor is that the clearance hole 22 must have a diameter less than the outer diameter of the insert 14.

Figure 5:
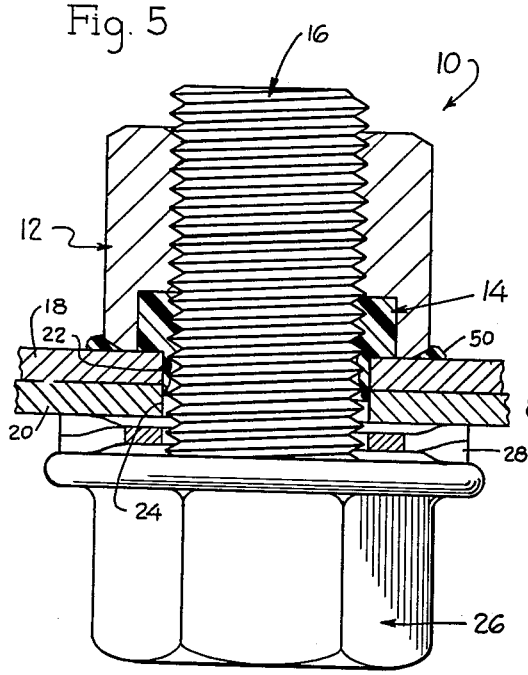
FIG. 5 is a vertical view, partially in section, showing the nut and insert assembled to a stud and workpiece and illustrating the sealing action and the cold flowing characteristics of the insert.

Due to the cold flow characteristics of the plastic material, the plastic insert 14 will have threads formed therein during the compression thereof complementary with the stud 16. The plastic insert will also cold flow into the configuration of the counterbore 36 so as to become substantially integral with and therefore backoff with the nut and have a general appearance somewhat as shown in FIG. 5. The characteristic of the material is such that it provides a prevailing torque on the stud 16 preventing relative rotation therebetween.

As aforementioned, the insert means 14 is preferably beveled at 46 which aids initial assembly of the insert means to the counterbore of the nut as well as aiding in "centering" on the clearance hole in the workpiece of application. However, for production considerations, it has been found that non-beveled inserts formed of short sections of tubing cut to predetermined length, such as shown in FIG. 4 and shown with the reference numeral 14' also gives a wide range of effective seals over a wide variation of tolerances.

Figure 4:
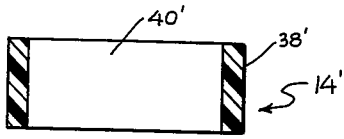
FIG. 4 is an alternative embodiment of insert.
Figure 6:
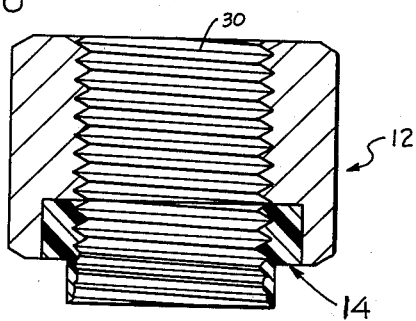
FIG. 6 is a vertical sectional view similar to FIG. 1 showing the nut and insert after it has been removed from an assembly similar to FIG. 5.

A bevel ended counterbore in the nut (not shown) may be used, particularly with a straight end 14' as shown in FIG. 4 as the bevel end counterbore helps shape the straight end of the insert and engage the upper end with the threads of the male stud. The beveled ended counterbore may give slightly better sealing of the threads adjacent thereto with a slight sacrifice in thread length of the nut.

From the foregoing it is seen that the nut and insert are easily preassembled by merely requiring a forcefit relation, there is a free run-on of the nut and insert combination to the stud, that the sealing nut provides excess stock on the lead-in edge to afford accommodation to a wide range of tolerances, that after final assembly of the nut and insert to a stud and workpiece of application, the insert becomes deformed and cold flows into a configuration so as to form threads in the insert and also cause the insert to flow into the upset portions of the recess in the head of the nut so as to make the insert in the head of the nut an integral member allowing the insert and the nut to be backed off as an integral unit, and that while the nut and insert are in assembly to a thread and workpiece of application, the insert affords a fluid tight seal and a prevailing torque lock upon the threads of the stud to prevent voluntary regressive motion of the nut. It is also apparent that the nut and insert are readily adapted to mass manufacturing techniques since no staking operation or swaging or other means other than an interference or force friction fit is necessary to retain the two in preassembled relation.

Although specific embodiments have been shown and described, it is with full awareness that many modifications thereof are possible. The invention, therefore, is not to be restricted except in so far as is necessitated by the prior art and by the spirit of the appended claim.

What is claimed by the invention is:

A preassembled nut means and plastic insert for application to a threaded stud means projecting through a workpiece having a clearance aperture comprising nut means having central threaded bore for cooperation with said threaded stud means, said nut means being characterized by a polygonal sided counterbore of a predetermined radial size larger than the root diameter of the threaded bore and defining a shoulder, recess means formed in side walls of the counterbore, protuberances on said shoulder adjacent said recess means, said protuberances being integrally secured to counterbore sides and provided by material removed from said side walls to form said recess means and hollow cylindrical insert means of plastic material having an axial length that exceeds the depth of said counterbore by at least 20% and having an outer diameter adapted to force fit and be retained in preassembled relation within said counterbore, the internal diameter of said insert means being greater than the root diameter of said threaded bore, said recess means providing a keyway for said insert means after deformation thereof in application to said threaded stud means and workpiece to maintain the integralness of the nut means and insert means when removing same after initial application thereof, said protuberances on said shoulder adjacent said recess means preventing rotational relative movement of said insert means relative to the nut means during initial assembly to the stud means.

References Cited in the file of this patent

UNITED STATES PATENTS

| 952,507 | Burns | Mar. 22, 1910 |
| 2,390,726 | Mitchell | Dec. 11, 1945 |
| 2,450,694 | Sauer | Oct. 5, 1948 |
| 2,502,642 | Currlin | Apr. 4, 1950 |
| 2,718,691 | Sussenbach | Sept. 27, 1955 |
| 2,759,743 | Bloom | Aug. 21, 1956 |
| 2,968,821 | Morin et al. | Jan. 24, 1961 |

FOREIGN PATENTS

| 267,683 | Italy | Sept. 16, 1929 |
| 514,985 | Great Britain | Nov. 22, 1939 |
| 569,550 | Great Britain | May 29, 1945 |
| 568,068 | Belgium | Nov. 27, 1958 |
| 1,196,411 | France | May 25, 1959 |